United States Patent [19]

Laurent

[11] Patent Number: 5,736,223

[45] Date of Patent: Apr. 7, 1998

[54] MULTILAYER EMBOSSED PAPERS, AND DEVICE AND METHOD FOR PRODUCING SAME

[75] Inventor: Pierre Laurent, Colmar, France

[73] Assignee: James River, Kunheim, France

[21] Appl. No.: 591,482

[22] PCT Filed: Jul. 8, 1994

[86] PCT No.: PCT/FR94/00852

§ 371 Date: Feb. 7, 1996

§ 102(e) Date: Feb. 7, 1996

[87] PCT Pub. No.: WO95/02089

PCT Pub. Date: Jan. 19, 1995

[30] Foreign Application Priority Data

Jul. 9, 1993 [FR] France .................. 93 08509

[51] Int. Cl.⁶ .................. B32B 3/00; B31F 1/22
[52] U.S. Cl. .................. 428/154; 428/156; 428/166; 428/172; 428/178; 428/198; 428/219; 428/340; 156/209; 156/290; 156/291; 156/292; 162/109; 162/113; 162/314; 162/362

[58] Field of Search .................. 428/172, 154, 428/166, 178, 156, 167, 198, 219, 340, 537.5; 162/109, 112, 113, 296, 265, 314, 362; 156/181, 209, 290, 291, 292; 118/211, 244

[56] References Cited

U.S. PATENT DOCUMENTS 5,382,464  1/1995  Ruppel et al. .................. 428/172

*Primary Examiner*—Donald Loney
*Attorney, Agent, or Firm*—Breiner & Breiner

[57] ABSTRACT

The multi-layer paper composed of at least three embossed plies of paper (1,2,3) having regularly distributed projections characterized in that it includes two so-called external plies (1,3) of which the respective projections (10,30) are in tip-to-tip positions and a third embossed so-called middle ply (2) of which the projections (20) nest between projections of one of the two external plies (1 or 3).

14 Claims, 1 Drawing Sheet

MULTILAYER EMBOSSED PAPERS, AND DEVICE AND METHOD FOR PRODUCING SAME

The objects of the present invention are novel multi-layer papers, a device/apparatus and a method for their manufacture.

FIELD OF INVENTION

In particular, the invention concerns household and domestic papers, especially embossed paper based on cotton wadding or creped tissue paper. In this field, there is much interest in high absorption paper also having great softness and good mechanical strength.

BACKGROUND OF THE INVENTION

Already for many years multi-layer papers have been used in this field. As a rule, two or three previously embossed layers are made to slightly bond to one another with adhesive deposited upon the ends of the projections made during embossing.

Presently, two different procedures for embossing, assembly and bonding are used which result in two different structures. A first structure involves two identical embossings on two separate paper plies in order to provide projections on the plies and forming a laminate from these two plies. The projections of the two plies point toward the laminate inside and are bonded to each other at their ends. This procedure implements what is appropriately called a "tip to tip" assembly. Such a procedure, as well as the laminates made by it, are described in U.S. Pat. No. 3,414,459. This procedure in essence allows for making two-layer papers having the structure of FIG. 6 of U.S. Pat. No. 3,414,459. A variation also described in that patent and shown in FIG. 7 consists in sandwiching an unembossed ply between the two embossed ones before bonding the tips.

Another procedure, described in particular in U.S. Pat. No. 3,867,225, also provides a laminate of two embossed plies which are also arranged in such a manner that the projections point inward the laminate whereby the projection ends of one of the two plies are coated with adhesive and the bonding is carried out in a position such that the projections of one ply nest between two projections of the other ply. This is the so-called "nested" structure.

In general and as regards household uses, assemblies of embossed plies of paper are sought which essentially combine softness, pleasant touch, good absorption and good mechanical strength.

OBJECTS AND BRIEF DESCRIPTION OF THE INVENTION

Applicant has done research in this field and now has discovered a novel structure composed of at least three plies of embossed paper. The structure has improved softness because more air is trapped between the paper layers while at the same time mechanical strength is increased.

Accordingly, the present invention proposes a novel structure of multi-layer embossed paper evincing properties heretofore never combined. The invention also relates to a method and apparatus for making these multi-layer papers.

In one of its essential features, the invention concerns a multi-layer paper composed of at least three embossed plies of paper having regularly distributed projections and including two so-called external plies of which the respective projections are placed tip to tip and an embossed third, so-called middle, ply of which the projections nest between the projections of one of the two external plies.

Such a structure simultaneously offers the advantages of the above noted "tip to tip" and "nested" structures without incurring the drawbacks of either one and, in particular, the structure of the invention improves the mechanical strength over that of a simple "tip-to-tip" structure and also improves the softness of a simple "nested" structure.

Accordingly, the multi-layer papers of the invention offer simultaneously good structural stability, good crush resistance whereby they are kindred to nested products, and increased thickness whereby touch and softness are improved.

As regards the multi-layer papers of the invention, the two external plies generally have identical embossings, i.e., they have the same repeat patterns and the same magnitudes. These two plies are arranged symmetrically so that the ends of their projections are mutually opposite.

The projections of the middle ply are nested between the projections of one of the external plies and advantageously have a height at most equal to the heights of the projections of the external ply between which they nest. This feature offers the advantage of precluding all asperities inside the compound paper which would degrade the touch and softness of the paper.

However, the height of the projections of the middle ply advantageously should be at least 50% of the height of the projections of the external ply between which they are nesting. Such a proportion allows for good mechanical properties.

Advantageously, and as is the case for the multi-layer papers made of several embossed plies of paper, the cohesion between the various plies of embossed paper of the invention should be implemented by adhesion. This bonding is implemented at the ends of the external ply projections which are in mutual tip to tip positions. Accordingly, each of the tips of one of the external plies will bond to the middle ply between two consecutive projections of the middle ply while being opposite a symmetrical projection of the other external ply.

In a variation of the invention, and in order to further improve if called for, the strength of the multi-layer paper assembly, at least one of the two external plies can be replaced by a double-layered paper which is embossed in the same manner.

In the invention, the external plies of the multi-layer paper advantageously are composed of creped paper of cellulose-wadding, i.e., tissue paper type. This tissue paper advantageously evinces a specific weight between 10 and 30 g/m².

Advantageously the middle ply is composed of a tissue paper sheet evincing a specific weight between 10 and 30 g/m².

As regards household paper, it is conventional to use tissue papers that have been processed to improve their wet strength. Such tissue papers can be used in making the three plies constituting the multi-layer paper of the invention.

However, in an advantageous variation of the invention, the middle ply is a paper which has not been treated to improve its wet strength.

By using such a grade of paper for the middle ply, it is possible to adhesively coat only the tips of the projections of a single one of the two external plies because the middle ply in such a case offers good permeability to the adhesive.

Again, and achieving the same advantageous effect when making the middle ply, any ply of paper evincing good permeability to adhesive can be used.

Another feature of the invention relates to manufacturing the above described multi-layer papers.

Such a manufacturing method involves:

embossing a first paper ply with projections on one side of the ply, separately embossing a second ply by making projections on it with the same repeat pattern as in the embossings of the first ply, separately embossing a third ply also having the same embossing repeat pattern, and combining the three above embossed plies so that the first two plies are arranged tip to tip and the third ply is sandwiched between the two first plies while nesting relative to one of them.

To improve cohesion between the different plies of paper constituting the multi-layer paper of the invention, the various plies advantageously are adhesively bonded to each other. This bonding is carried out at the projections of the external plies and, for that purpose, adhesive is deposited onto the ends of the sets of projections of the two external plies and thereby each of the external plies is reliably bonded to the middle ply.

However, and to the extent that the middle ply is sufficiently permeable to the adhesive, it can suffice to deposit adhesive solely on the projection ends of one of the two external plies.

Another feature of the invention concerns apparatus with which to manufacture the above described multi-layer papers.

Such apparatus comprises three embossing units of which at least two are displaceable. Each of these units comprise two cylinders, one cylinder being made of an engraved and undeforming material, the other cylinder being made of an elastic material. The three engraved cylinders comprise identically spaced engravings.

Where called for the invention also can comprise an adhesive-deposition unit.

Other purposes and features of the invention are elucidated in the following description relating to the attached drawing.

DESCRIPTION OF PRESENTLY PREFERRED EMBODIMENTS

Figure 1:
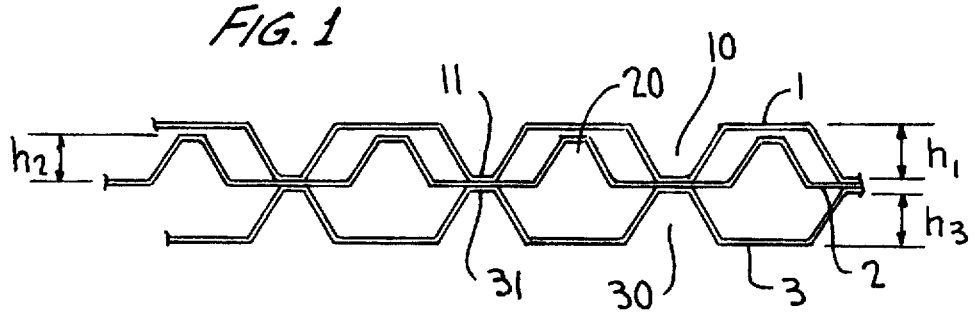
FIG. 1 schematically illustrates the structure of a multi-layer paper sheet of the invention.

FIG. 1 shows the structure of a sheet of a multi-layer paper of the invention. This sheet is composed of three plies 1, 2, 3. The plies 1 and 3 constitute the external plies of the paper of the invention. They are fitted with symmetrical embossings arranged in such a manner that their respective projections 10 and 30 are arrayed tip to tip. In the structure shown in FIG. 1, the height h1 of the projections of ply 1 is identical with the height h3 of the projections of the external ply 3.

The middle ply 2 is affixed to external plies 1 and 3 in such a manner that the projections 20 nest between two consecutive projections of ply 1.

The height h2 of the projections of ply 2 in the case shown in FIG. 1 is slightly less than the height h1 of the projections of ply 1. This feature offers the advantage of precluding any asperities on the paper surface while still providing excellent mechanical strength.

Bonding is implemented at the ends 11 of projections 10 of ply 1 and at the ends 31 of projections 30 of ply 3. The ends of these projections bond together while being between two consecutive projections 20 of ply 2.

Figure 2:
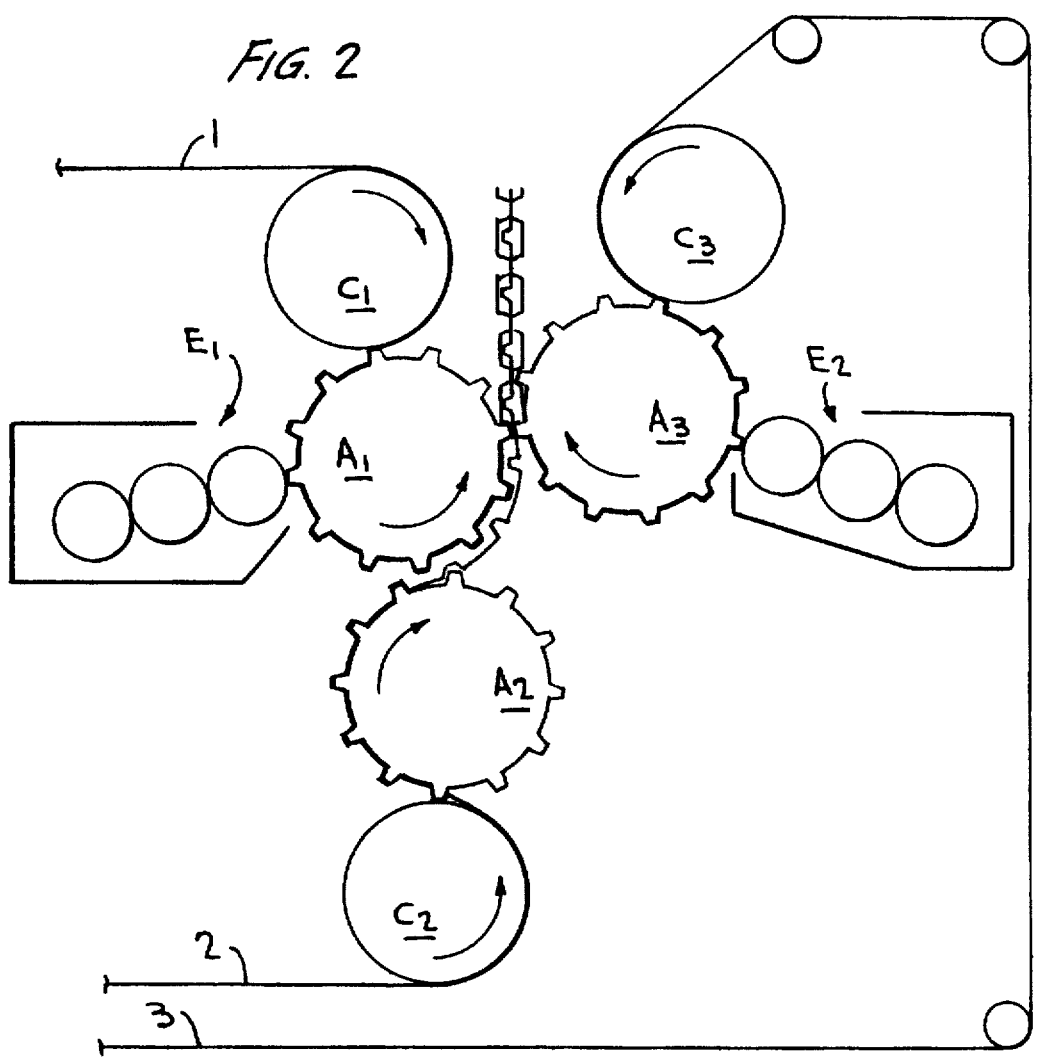
FIG. 2 schematically illustrates apparatus with which to manufacture a multi-layer paper of the invention.

FIG. 2 shows apparatus for manufacturing a multi-layer paper made of three layers of embossed paper.

This apparatus is composed of three embossing units, respectively (A1,C1), (A2,C2), and (A3,C3), each including a cylinder A1, A2, A3 made of an engraved, undeforming material, such as steel, and a cylinder C1, C2, C3 made of an elastic material, such as rubber. In the apparatus of FIG. 2, two units E1 and E2 for depositing adhesive on the projection ends that were made by embossing plies 1 and 3, respectively, on the engraved cylinders A1 and A3 are shown.

As discussed above, depending on the nature of the middle ply, a single adhesive-depositing unit E1 or E2 can suffice provided that this middle ply is sufficiently permeable to the adhesive.

The embossing unit (A1,C1) is stationary whereas the other two embossing units are displaceable and are mounted in such a manner that the projection ends of cylinder A3 will coincide in operation with those of cylinder A1, whereas the projection ends made by cylinder A2 will nest between the projection ends of the engraving of cylinder A1.

When operating, the various cylinders rotate in the directions of the arrows shown on these cylinders in FIG. 2.

Ply 1, received from a take-off reel not shown, is embossed while passing between cylinders A1 and C1 of the first embossing unit.

Ply 2, received from a take-off reel not shown, is embossed while passing between cylinders A2 and C2 of the second embossing unit. Ply 3 also is embossed while passing between cylinders A3 and C3 constituting the third embossing unit.

The above described relative positions of cylinders A1, A2 and A3 are such that plies 1 and 3 are in a tip to tip position whereas ply 2 will nest in and mesh with the other two plies.

The two adhesive depositing units E1 and E2 allow for depositing of adhesive to the ends of the projections made in plies 1 and 3 and ensures bonding of these plies when they pass between the coincident projections from cylinders A1 and A3.

I claim:

1. A multi-layer paper comprising at least three embossed plies of paper with each ply having regularly distributed projections, wherein two of said at least three embossed plies of paper comprise a first external ply and a second external ply and are positioned in relation to each other such that projections on the first external ply are arrayed in a tip-to-tip relation with projections on the second external ply, and further wherein another ply of said at least three embossed plies of paper is present as a middle ply between said first external ply and said second external ply so that projections of said middle ply nest between adjacent projections of one of the first external ply or the second external ply.

2. Paper according to claim 1 wherein said projections of each of the first external ply and the second external ply are present in an identical repeat pattern and are of an identical height.

3. Paper according to claim 1 wherein the projections of the middle ply have a height which is at most equal to a height of the projections of the external ply between which the projections of the middle ply nest.

4. Paper according to claim 3 wherein the height of the projections of the middle ply is at least 50% of the height of the projections of the external ply between which the projections of the middle ply nest.

5. Paper according to claim 1 wherein an adhesive forms a bonding spot at the ends of the projections of the first external ply and the second external ply which are arrayed tip-to-tip.

6. Paper according to claim 1 wherein at least one of the first external ply or the second external ply has a double thickness of paper.

7. Paper according to claim 1 wherein each of the first external ply and the second external ply comprises cellulose wadding having a specific weight of between 10 and 30 $g/m^2$.

8. Paper according to claim 1 wherein the middle ply comprises cellulose wadding having a specific weight of between 10 and 30 $g/m^2$.

9. Paper according to claim 1 wherein the first external ply, the second external ply and the middle ply comprise cellulose wadding pretreated to improve wet strength of the ply.

10. Paper according to claim 1 wherein the middle ply comprises cellulose wadding unpretreated to improve wet strength of the cellulose wadding.

11. A method for manufacturing a multi-layer paper according to any one of claims 1, 2, 3, 4, 5, 6, 7, 8, 9, or 10 comprising (1) embossing the first external ply by making projections in one side of the first external ply, (2) embossing separately the second external ply by making projections on one side of the second external ply having a repeat pattern identical to the projections in the first external ply, (3) embossing separately a third ply, which is a middle ply, by making projections in said third ply having a repeat pattern identical to the projections in the first external ply, and (4) combining the first external ply, the second external ply and the middle ply such that the projections of each of the first external ply and the second external ply are arrayed tip to tip and such that the middle ply is positioned between the first external ply and the second external ply and such that the projections of the middle ply nest between adjacent projections of one of the first external ply or the second external ply.

12. Method according to claim 11 wherein ends of the projections of at least one of the first external ply and the second external ply are coated with an adhesive before combination of the first external ply, the second external ply and the middle ply.

13. Apparatus for manufacturing a multi-layer paper according to any one of claims 1, 2, 3, 4, 5, 6, 7, 8, 9 or 10 comprising three embossing units of which at least two are displaceable, and wherein each of said three embossing units comprises two cylinders of which one cylinder is made of an engraved, undeforming material and another cylinder is made of an elastic material, and further wherein each engraved undeforming cylinder is fitted with engravings having identical spacings to each other.

14. Apparatus according to claim 13 further comprising at least one adhesive-depositing unit.

* * * * *